United States Patent [19]

Norman et al.

[11] Patent Number: 5,702,305

[45] Date of Patent: Dec. 30, 1997

[54] ELECTRONIC GAME SYSTEM

[75] Inventors: Michael P. Norman, Chandler; Karen E. Jachimowicz, Laveen, both of Ariz.

[73] Assignee: Motorola, Schaumburg, Ill.

[21] Appl. No.: 601,925

[22] Filed: Feb. 15, 1996

[51] Int. Cl.$^6$ ................................................. A63F 9/24
[52] U.S. Cl. .......................... 463/42; 463/31; 463/39; 463/1; 273/237
[58] Field of Search .................... 463/1, 7–16, 30–31, 463/25, 40–42; 273/292, 237, 256, 273, 278; 364/410, 411; 345/7–11, 156, 158; 359/13, 109, 630, 558; 385/133, 147, 901

[56] References Cited

U.S. PATENT DOCUMENTS

| | | |
|---|---|---|
| 4,624,462 | 11/1986 | Itkis . |
| 4,856,787 | 8/1989 | Itkis . |
| 5,056,106 | 10/1991 | Wang et al. . |
| 5,224,198 | 6/1993 | Jachimowicz et al. ............. 385/133 |
| 5,283,733 | 2/1994 | Colley ............................... 364/411 |
| 5,319,548 | 6/1994 | Germain ........................... 364/410 |
| 5,354,057 | 10/1994 | Pruitt ..................................... 463/5 |

*Primary Examiner*—Jessica Harrison
*Assistant Examiner*—Mark A. Sager
*Attorney, Agent, or Firm*—Eugene A. Parsons

[57] ABSTRACT

An interactive electronic game system (10) composed of at least one control unit (12) for receiving, monitoring, compiling and transmitting game data and information and several personal display units (14) for controlling game play and displaying game data and information. The personal display units (14) and the control unit (12) being in constant omni-directional communication. The personal display units (14) of the system having an aperture (100) formed therein, and capable of receiving and displaying game data and information in a direct view image and/or a virtual image.

31 Claims, 8 Drawing Sheets

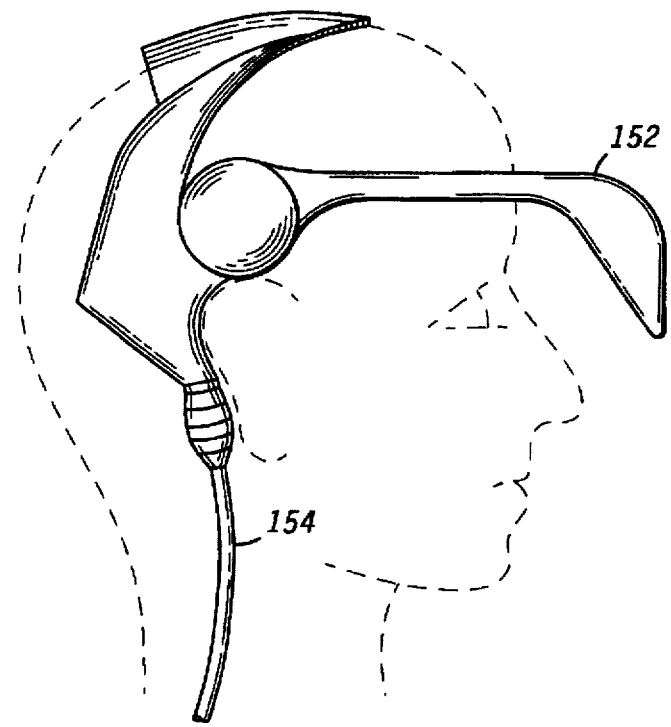
FIG. 14
FIG. 15
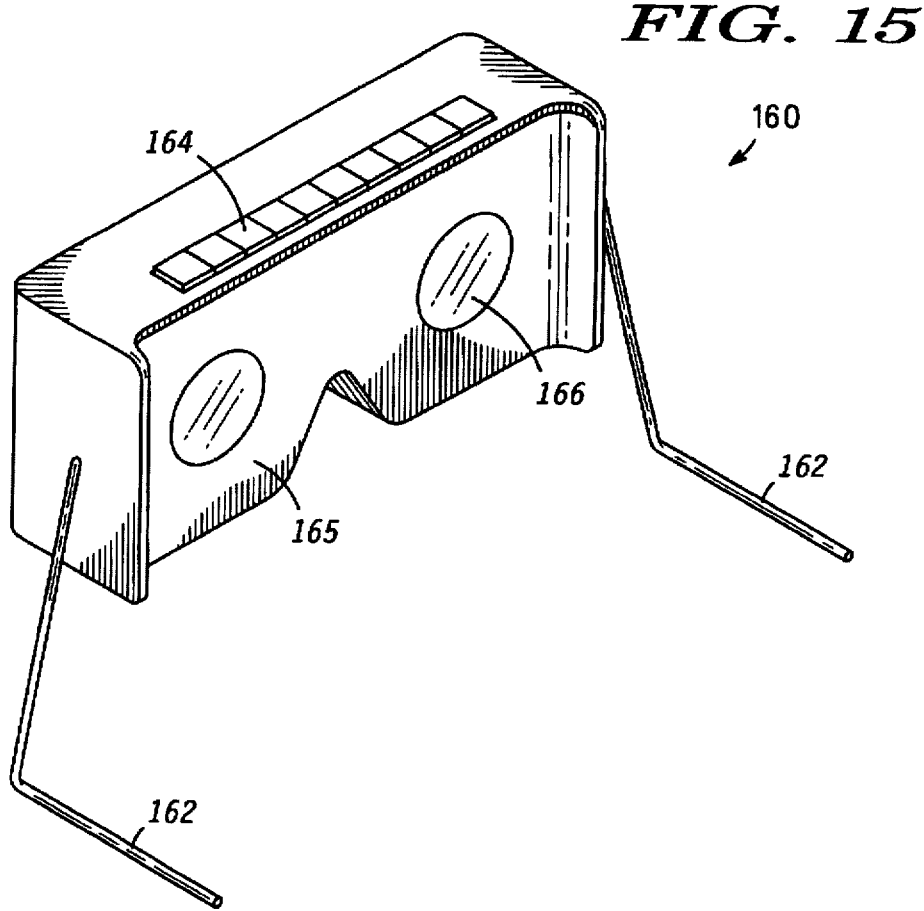

ELECTRONIC GAME SYSTEM

FIELD OF THE INVENTION

The present invention pertains to games, and in particular interactive electronic games having a control unit and individual player display units, together capable of receiving, monitoring, processing and displaying game data, through both direct view displays and/or virtual image displays.

BACKGROUND OF THE INVENTION

Electronic games are experiencing a surge in popularity in the current world of game entertainment. Electronic games can be found in both public establishments, such as video arcades, etc., as well as in private homes, in the form of handheld devices and computer games. Of concern in using games of this sort is the lack of social interaction between the players and the increased isolation generally found by those participating in the electronic games most commonly available on the market.

Prior to this increase in the popularity of electronic games, board games experienced great appeal due to the level of social interaction required between the players. Board games had, and continue to have, the ability to create social interaction amongst its players through speaking, laughter, etc. due to the close proximity of the players. There exist the need to incorporate this type of social interaction into electronic games by creating an interactive electronic game, for example a multi-player interactive electronic card game, that is capable of compiling overall common knowledge game data and information through a control unit and displaying it to the individual players as either a direct view image through a centrally located display, or as a direct view or virtual image through a plurality of personal display units. Simultaneously, personal game data and information regarding the individual players is displayed as a virtual or direct view image through the personal display units. The control unit and all personal display units remain in constant omnidirectional communication at all times. This interactive system of multiple display units creates social interaction amongst the players while playing the game.

Of particular interest to players of electronic games are the access and compilation of individual player data, overall game data and the monitoring or viewing of this compilation of data. As previously stated, either the centrally located display, or the personal display units are capable of displaying overall game information that is accessible to all players. In addition, the personal display units display information regarding each individual player, and only information regarding the player in possession of that particular personal display unit. This allows for tactical game play, in that personal game data and information regarding each individual player is not common knowledge or known by the other competing players.

The typical electronic games, currently available on the market are generally intended for individual play, or multiple player play, with only one player actually playing the game at a time, i.e., taking turns to input information into a control unit or otherwise "playing" the game. There does not exist the ability while playing electronic games of this sort for one player to input and receive information to and from a control unit, while simultaneously allowing additional players to input information, or observe overall game data and statistics for monitoring the game or determining tactical decisions through personal display units, in communication with a control unit.

Thus, there is a need for an electronic game system that allows for multi-player interaction through the use of a control unit and a plurality of individual player display units, capable of displaying information through direct view images and/or virtual images.

Accordingly, it is highly desirable to provide for an electronic game system that provides for player interaction using a plurality of display units and a control unit that in combination receive, monitor, compile and display game data and information.

It is a purpose of the present invention to provide a new and improved interactive multi-player electronic game system.

It is a further purpose of the present invention to provide a new and improved interactive multi-player electronic game system that utilizes a control unit and a plurality of personal display units to receive, monitor, compile and display game data.

It is a still further purpose of the present invention to provide a new and improved multi-player electronic game system which allows each player to view overall game data and statistical information through a central display, or alternatively through an individual personal display unit, and personal game data through the individual personal display unit.

It is yet another purpose of the present invention to provide a new and improved electronic game system that utilizes a control unit and a plurality of personal display units capable of displaying great amounts of information through the use of virtual image displays and/or direct view displays.

SUMMARY OF THE INVENTION

The above problems and others are substantially solved and the above purposes and others are realized in an electronic game system in which there exists a control unit for receiving, monitoring and compiling game data and statistics, in direct communication with a plurality of personal display units, for each individual player. Each personal display unit is capable of allowing the individual player to monitor the individual's personal game status as well as a means for obtaining additional data, help, clues, or in planning future tactical moves with regard to the game being played. Personal information received by each personal display unit, is unique to that unit and player, and is not received by the remaining units and players. Each personal display unit can additionally receive general overall game data and information compiled by the control unit. Alternatively, overall game data and information can be broadcast to all players by a centrally located direct view image display. Each personal display unit is linked to the control unit via a means for communication, which can be a wired or wireless, utilizing infra-red (IR) technology, radio frequency (RF) technology, vertical cavity surface emitting laser (VCSEL) technology, cellular links, optical links via fiber cable or other means for communication.

As stated, there exist a common group view area or display, either viewed as a centrally located display, utilizing a direct view image, visible to all players for communicating game data and information on a general level, or through each personal display unit as a direct view or virtual image. In addition, there exist a private view area or display, provided on the personal display unit for each player, which utilizes either a direct view image, a virtual image or both for communicating personal or private game data and information unique to that player.

The benefits of this type of electronic game structure, extend much further than solely promoting social interaction amongst the players, it aids the actual "playing" of the game by adding another dimension to the game, in that there can be constant "play" in action. One of the dynamics of electronic games is finding out new data discoveries. In playing a game using the electronic game system of the present invention, each player would be given a limited amount of information. At the start of the game, the common group view area, or display, contains "playing field" type information to define that particular game. This can be a deck of cards, face down, or can be a portion of a simulated world, in which the player can move. For example, the common view area shows the player whose turn it is, and the area surrounding that player. This image can be seen through a centrally located direct view image by all players of the game or, alternatively, on each player's personal display unit as a direct view or virtual image. As the player moves, game data changes. These data changes may be known by all players in the common view area or display, or only to the player moving on their personal display unit in the private view area or display, depending on the nature of the event.

As an example, if the player is "building" an object, what they build, such as a railroad, bridge, building, hotel, etc., depending on the game, can be visible to the other players, but private information, like how much money they have or what they have learned, remains private, and would only be displayed on that players personal display unit.

There exists great possibilities for interaction between players, such as privately proposed trades, alliances or exchanges of information that are very difficult to do, without the central computerized assistance this system provides in the form of the control unit. While others are taking their turns, individual players can check their inventory or condition, plan their next move, or communicate secretly with other players amongst their own personal display units.

Electronic games played over a modem do not fill the need for interaction between players of electronic games, in that modem games are commonly expensive to play, and there is no common view area, separate and apart from individual personal view area. In addition, the human interaction dimension is lacking, such as laughter, teasing, and joy, due to the continued isolated locality in playing the game. Modem games, like other commonly known computer games, are in a sense, also unsociable in nature.

The game system of the present invention, on the other hand, provides both types of viewing areas, a common group view area and a personal view area. This game system, composed of separate components, namely, a control unit or units, in combination with a plurality of personal display units, would allow a whole range of socially involving, but stimulating and challenging games. The social nature of this type of electronic game can lead to greater and greater acceptance of electronic games, because the fun is not at the expense of isolation.

One of the possible applications of this type of interactive electronic game product is in card games. Specifically, a game in which each player uses a personal display unit, displaying an image of playing cards, either as a direct view image or a virtual image, instead of using actual playing cards. The personal display unit will show the player the cards he or she has been dealt, the options or choices the player has, the cards "on the table" for all players to see, and any other pertinent information the player may need. This type of personal viewing area or display can be displayed by the personal display unit either as a direct view image, giving only minimal information, and/or as a virtual image, containing vast amounts of information. The personal display unit can also have the capability to answer questions the player has, supply game rules, etc. The control unit, utilizing a microprocessor or a plurality of interfaced microprocessors, such as dual interfaced microprocessors, or alternative means for controlling, some of which are disclosed herein, controls the play, allowing players to successively take their turns, keeping track of their input, dealing the cards, updating each players personal display unit as play progresses as to what the other players have done, what cards are on the table, and possible play options. Players each take their turn by choosing from their options (determined by the particular game played) which could include discarding or obtaining more cards, laying cards on the table, calling trump, etc.

The personal display units of the present invention are disclosed as being either handheld, head-mounted, or table-mounted, utilizing various image sources. Regardless of the type of mounting, display and image source, when a player looks into the viewing port of their personal display unit, they will see an image, either direct or virtual, dependent upon the display module. Images displayed will vary dependent upon the particular game being played, but may include images such as each individual's cards, play options, instructions, cards on the table, and/or any other pertinent information It should be understood that the example used throughout this disclosure is for a card game, but other types of games are anticipated by this disclosure, such as DOMINOES, YAHTZEE, variations thereof, action games, etc.

BRIEF DESCRIPTION OF THE DRAWINGS

The novel features believed characteristic of the invention are set forth in the claims. The invention itself, however, as well as other features and advantages thereof will be best understood by reference to detailed descriptions that follow, when read in conjunction with the accompanying drawings, wherein:

FIG. 14 illustrates the rotatably adjustable head-mount personal display unit of the present invention properly mounted on an individual;

FIG. 15 illustrates a table-mounted personal display unit according to the present invention.

DETAILED DESCRIPTION OF THE PREFERRED EMBODIMENT

During the course of this description, like numbers are used to identify like elements according to the different figures that illustrate the embodiments of the invention.

The game system of the present invention may take on several different configurations dependent upon the type of microprocessors utilized and their computing power, the type of game software being utilized, as well as the intended complexity and cost of the final product. Disclosed are four configurations for a game system embodying the present invention. It should be understood that the embodiments disclosed are not meant to limit the configuration of the game system, but may be interchanged and/or combined with other configurations, and it is fully intended that all such changes in the disclosed embodiments come within the scope of the claims. Furthermore, it should be understood, that the basic game system as disclosed, is composed of at least one control unit in omni-directional communication with a plurality of personal display units.

Figure 1:
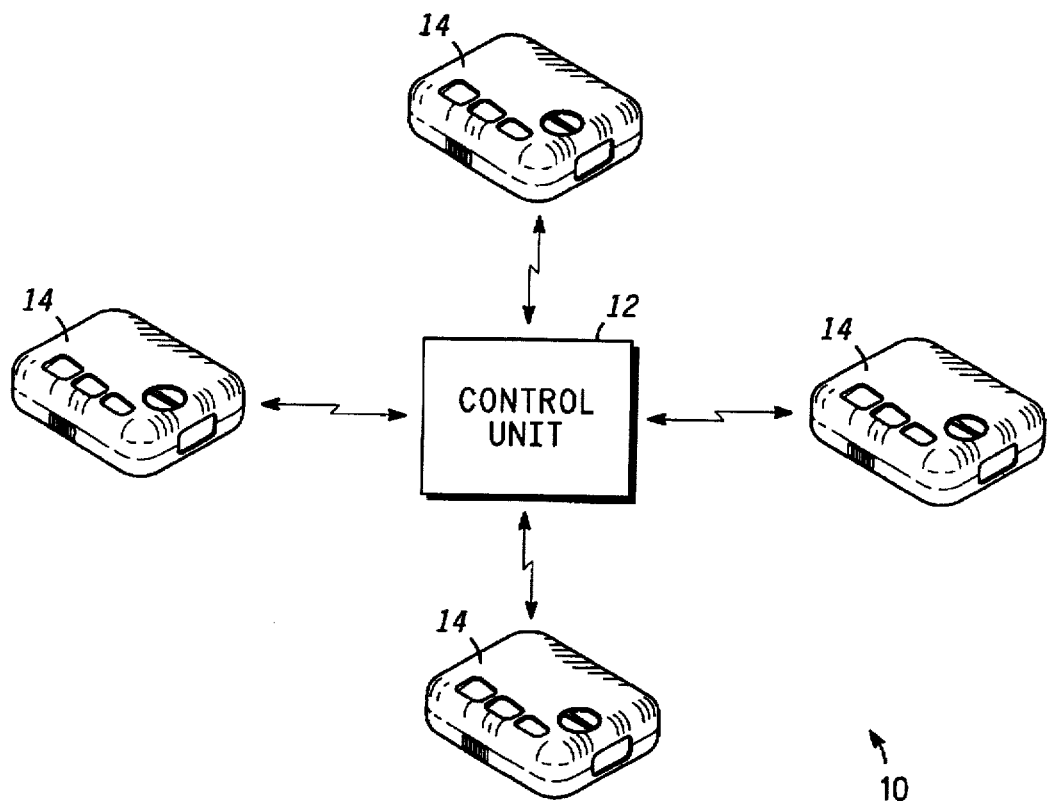
FIG. 1 illustrates a first embodiment of the game system of the present invention, showing a separate centrally located control unit in direct communication with each personal display unit.

Referring specifically to FIG. 1, schematically illustrated is a first embodiment of the game system of the present invention composed of a plurality of separate components. Illustrated is game system 10, composed of a central control unit 12 and a plurality of personal display units 14. Personal display units 14 are configured to be in direct communication with central control unit 12. Central control unit 12 is preferably composed of a microprocessor and a means for communication with each personal display unit 14 (discussed presently). Alternatively, it is disclosed that central control unit 12 may be composed of a plurality of interfaced microprocessors, thereby permitting the simultaneous input and output of game data while executing game algorithms, or have contained within other means for controlling game play such as a microcontroller with additional RAM, or adaptation for interfacing with a computer and required software. Central control unit 12 acts as the overall game controller and communicates with each personal display unit 14 through the means for communication informing the players of game data and information.

Figure 2:
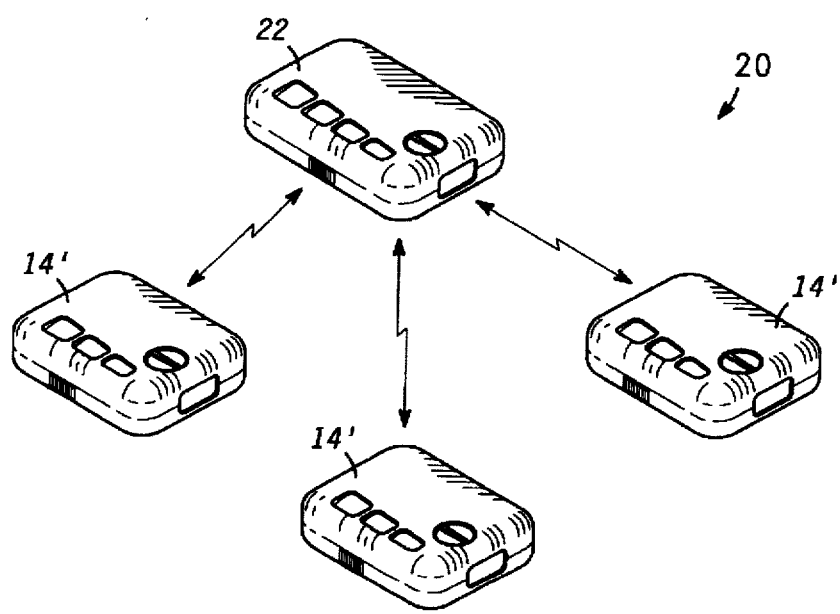
FIG. 2 illustrates a second embodiment of the game system of the present invention, showing the control unit contained in one of the personal display units, each of the other personal display units being in direct communication with the controlling personal display unit.

Referring specifically to FIG. 2, schematically illustrated is a second embodiment of the game system of the present invention. It should be noted that all components similar to the components illustrated in FIG. 1, are designated with similar numbers, having a prime added to indicate the different embodiment. Shown in FIG. 2 is game system 20 of the present invention composed of a plurality of personal display units 14', one of which contains a control unit (not shown), illustrated as personal display unit 22. Personal display units 14' and personal display unit 22 are all in direct communication with the control unit (not shown) contained in personal display unit 22. As in the previous embodiment, the central control unit is composed of a controlling microprocessor or alternative means, for receiving, monitoring, processing and compiling game data and information. Additionally, the central control unit has incorporated means for communicating with the plurality of personal display units 14' and 22.

Figure 3:
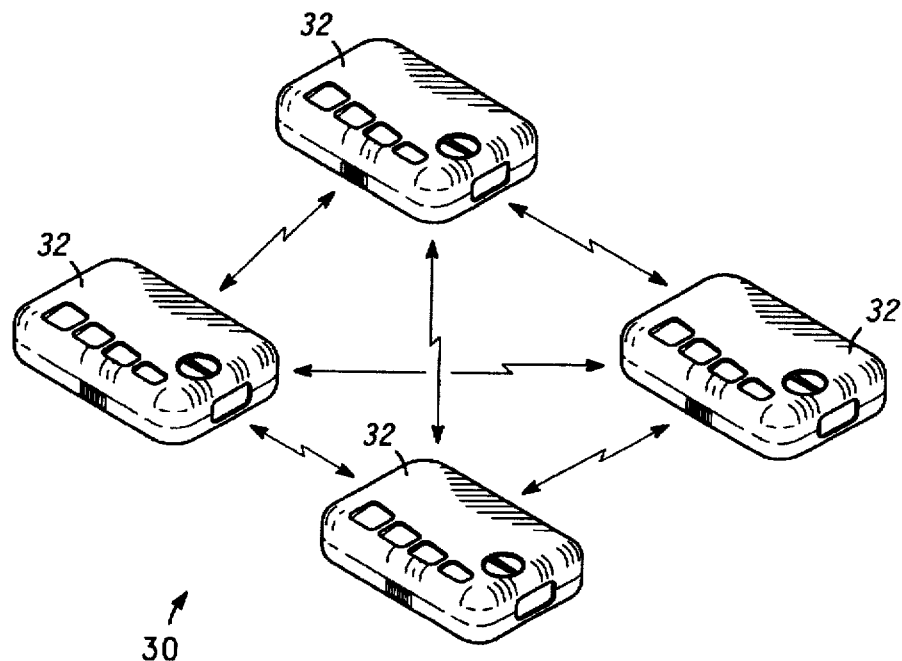
FIG. 3 illustrates a third embodiment of the game system of the present invention, showing each personal display unit containing a control unit, each control unit being in communication with all control units of the game system, one control unit being recognized as the controlling unit for the game system.

A third embodiment, schematically illustrated as FIG. 3, depicts game system 30 of the present invention composed of a plurality of personal display units 32, each having contained therein individual control units (not shown). It is disclosed, in that there are a plurality of control units present in this embodiment, that the control units will be programmed to recognize one specific control unit as a controlling control unit, thus responsible for receiving, monitoring, processing overall game data and information, and submitting signals to a common view display area and a personal view display area (discussed presently).

Figure 4:
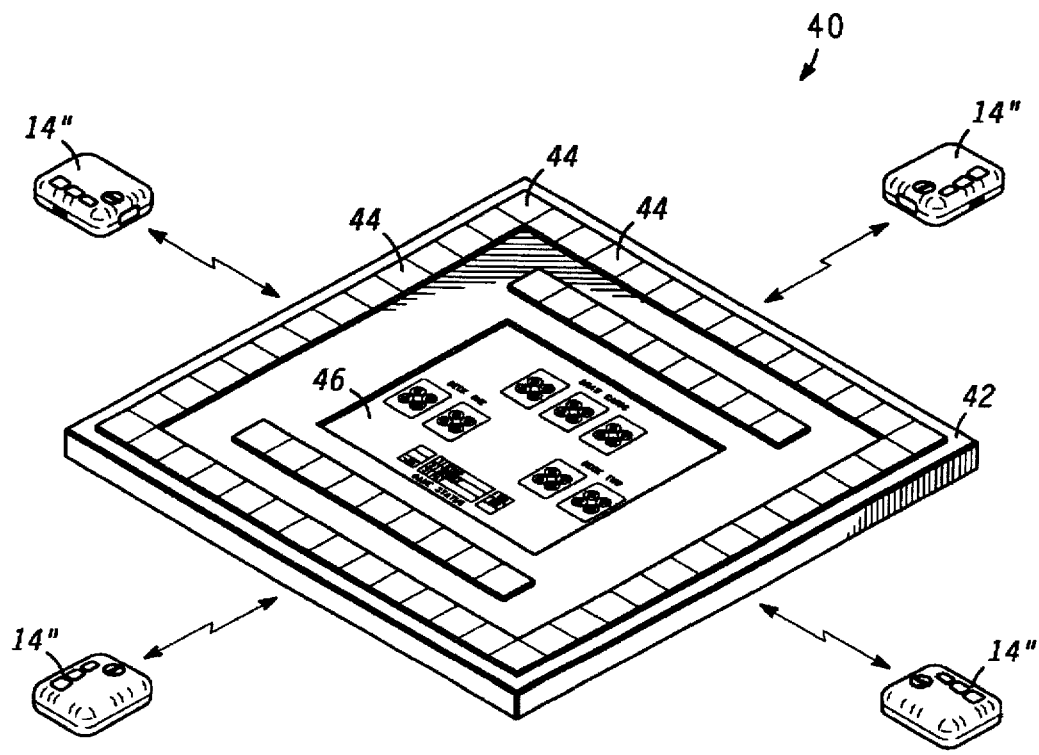
FIG. 4 illustrates a fourth embodiment of the game system of the present invention, showing a centrally located game board, containing an embedded control unit and a direct view display, and a plurality of personal display units being in direct communication with the centrally located control unit.

A fourth embodiment, schematically illustrated as FIG. 4, having components similar to components illustrated in FIGS. 1 and 2, designated with similar numbers and having a double prime added to indicate the different embodiment, depicts game system 40 of the present invention composed of a plurality of personal display units 14" in communication with a control unit (not shown) embedded in a centrally located game board 42. Game board 42 additionally may contain images 44 applicable to the game being played. It is disclosed that images 44 can be printed on game board 42, by some convenient method, or in the alternative can be individual embedded direct view image displays, capable of change in color and image depicted. In addition, it is disclosed to embed into game board 42 a centrally located direct view image display area 46 for the display of common view information, viewable by all players of the game.

It should be understood that the control unit or units of the various embodiments of the present invention are disclosed in the preferred embodiment as being composed of at least one microprocessor having omni-directional means for communication with personal display units 14, 14', 14", 22 and 32 of the respective embodiments. As previously stated, alternative means for controlling the game system are anticipated by this disclosure, e.g., a microcontroller having additional RAM, or means for interfacing with a computer and required software. It should be noted that the drawings all depict game systems having at least one control unit and four personal display units, thus four players. It should be understood that the game system of the present invention is adaptable to any number of players. It is anticipated that the personal display units can be marketed and sold in groupings and/or as additional units, capable of communication with other personal display units of similar type and configuration.

Figure 5:
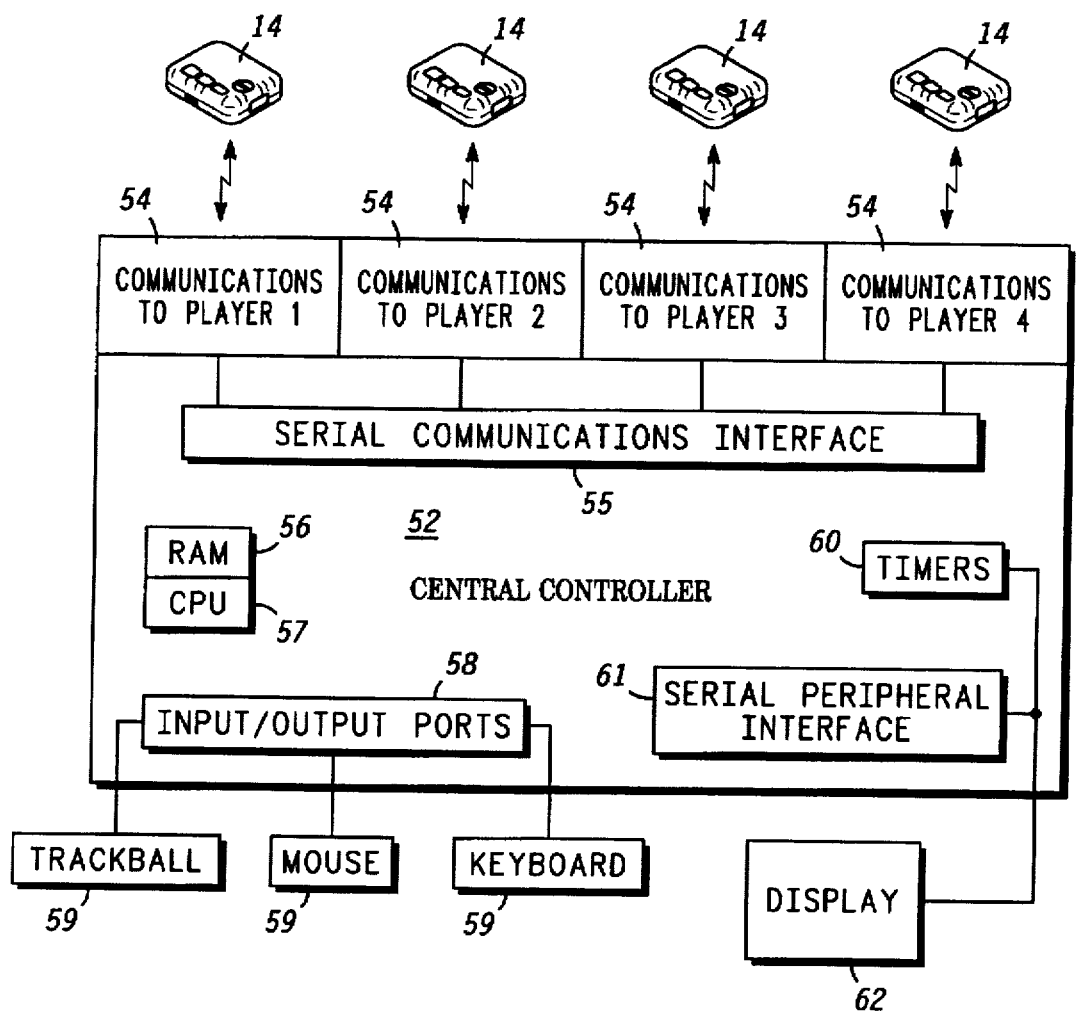
FIG. 5 is a schematic illustration of the interactive configuration between a centrally located control unit and the plurality of personal display units.

Referring now to FIG. 5, illustrated is a schematic diagram of a control unit 50 of the present invention, configured as a separate component as described previously in the disclosed first embodiment. The preferred embodiment of control unit 50 is typically composed of a single microprocessor, designated as a central controller 52 capable of receiving, monitoring, processing and compiling game information, composed of a serial communications interface 55, a random access memory (RAM) 56, a central processing unit 57, a plurality of input/output ports 58, at least one means for inputting information 59, such as a trackball, mouse and/or keyboard, a timer 60 and serial peripheral interface 61 for controlling a display 62. In the alternative, it is disclosed that control unit 50 may contain a plurality of microprocessors, dependent upon the particular configuration of the game system and as previously discussed in the disclosed embodiments, monolithically integrated on a single semiconductor chip, interfaced so as to allow for the simultaneous input and output of game date while processing game algorithms. In interfacing a plurality of microprocessors, it must be determined how data will be transferred between the microprocessors, the partitioning of the input and output functions between the microprocessors and the determination of which microprocessor will provide supervisory function over the game devices. Additionally, control unit 50 would be composed of alternative means for controlling, such as dual microprocessors, a means for interfacing with a computer and required software, or a microprocessor with additional RAM, all of which would allow for a plurality of players to "play" simultaneously. For example, a second player would be able to input information while the microprocessor, or alternative means for controlling disclosed herein, was reading input data from a first player. The game would be updated continuously and simultaneously according to the input data received. In addition, the game displays, including both the common view display area, having a central display, and the personal view display area, would be updated continuously and simultaneously.

Control unit 50 additionally contains a means for communication 54 to each personal display unit 14, 14', 14", 22 and/or 32 of the game system. Means for communication 54 are disclosed as being omni-directional, wired or wireless, preferably utilizing infra-red (IR) technology, radio frequency (RF) technology, vertical cavity surface emitting laser (VCSEL) technology, or optical link technology utilizing fiber cable. It is additionally disclosed, that remote playing, eliminating the need for players to be in close proximity, yet utilizing the game system of the present invention, may be accomplished using wireless communication technology, such as conventional modem, cellular or satellite technology.

Figure 6:
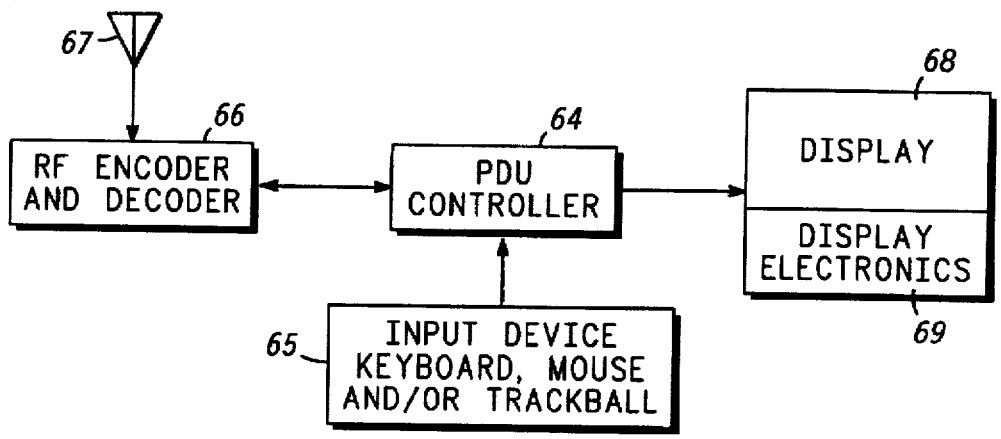
FIG. 6 is a schematic illustration of the components contained within each personal display unit of the present invention.

Referring specifically to FIG. 6, schematically illustrated are display electronic components of the plurality of personal display units of the present game system. Specifically, illustrated is a schematic representation of the components contained within the personal display units of the present invention, generally referenced throughout this disclosure as personal display unit 14, 14', 14", 22 and/or 32. Represented are personal display unit controller 64, in communication with a means for inputting information 65 such as a keyboard, trackball and/or mouse, a RF encoder and decoder 66, linked to an antenna 67, and image display 68 and display electronics 69, each having multi-directional connections to receive and display game data and information.

As previously stated, image display 68, for the common view display area and the personal view display area, may be a direct view image and/or a virtual image. Accordingly, it is disclosed to use a direct view image source commonly known in the art to create the direct view image display. Such sources can be, but are not limited to, those produced by a liquid crystal display (LCD), a laser projection, a plurality of light emitting diodes (LEDs), a plurality of organic LEDs, a field emission display (FED), a cathode ray tubes (CRT), an organic and an inorganic electroluminescent display, a plasma display and a vacuum fluorescent display (VFD).

Figure 7:
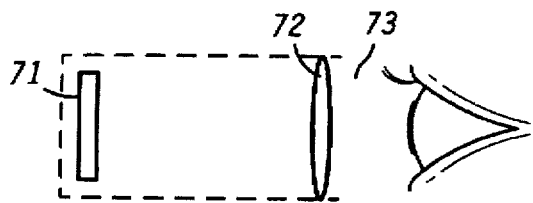
FIG. 7 is a simplified drawing of a miniature virtual display according to the present invention.

To create the virtual image display of the present invention, it is disclosed to utilize a miniature virtual display that may be configured in a variety of alternate ways. Specifically referring to FIG. 7, illustrated is a simplified diagram of a miniature virtual image display 70, which includes an image generation apparatus 71 for providing a complete image to a fixed optical system 72, which in turn produces a virtual image viewable by the operator through an aperture 73. Fixed optical system 72 is constructed to magnify the entire complete image from image generation apparatus 71, without utilizing moving parts, so that the virtual image viewable through an aperture 73, is a complete frame, or picture, which appears to be very large and is easily discernible by the operator. By producing the virtual image from the very small complete image of the apparatus, fixed optical system 72 is relatively small and adds virtually no additional space requirements. Optical system 72 is preferably constructed with no moving parts, other than optional features such as focusing, zoom lenses, etc. Further, image generation apparatus 71 requires very little electrical power to generate the complete image and, therefore, adds very little to the power requirements of personal display units 14, 14', 14", 22 and/or 32.

Figure 8:
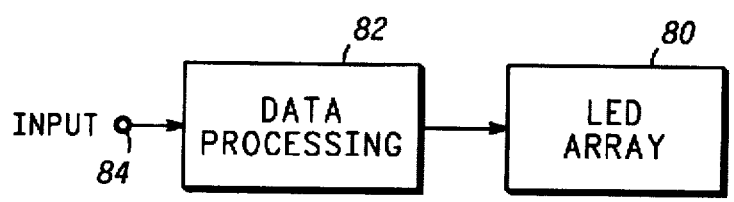
FIG. 8 is a block diagram of the image manifestation apparatus of the miniature virtual display of FIG. 7.

Referring now to FIG. 8, image generation apparatus 71, of miniature virtual image display 70 of FIG. 7, previously discussed, includes semiconductor electronics such as a light emitting diode (LED) array 80 driven by data processing circuits 82. Data processing circuits 82 include, for example, logic and switching circuit arrays for controlling each LED in LED array 80. Data processing circuits 82 include, in addition to or instead of the logic and switching arrays, a microprocessor or similar circuitry for processing input signals 84 to produce a desired complete image on a device such as LED array 80.

An LED array is utilized in this example because of the extremely small size that can be achieved and because of the simplicity of construction and operation. It will of course be understood that other image generating devices may be utilized for the miniature virtual image display, including, but not limited to, those previously stated for generating the direct view image, as well as a reflective spatial light modulator (RSLM), a vertical cavity surface emitting laser (VCSEL), and a direct retinal scan display (discussed presently).

Referring again to FIG. 7, fixed optical system 72 of miniature virtual image display 70 is mounted in spaced relation from image generation apparatus 71 so as to receive the image from the surface and magnify it an additional predetermined amount. It will of course be understood that fixed optical system 72 may be adjustable for focus and additional magnification, if desired, or may be fixed in a housing for simplicity.

Figure 9:
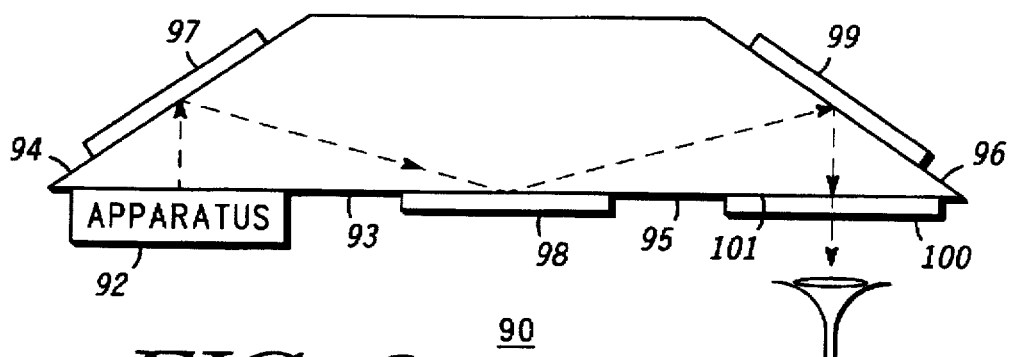
FIG. 9 is a simplified diagram of a waveguide virtual image display according to the present invention.

Another specific miniature virtual image display that may be used in creating the virtual image display of the present invention is an optical waveguide virtual image display 90, illustrated in FIG. 9. As illustrated, an image generation apparatus 92, similar to that described in FIGS. 7 and 8, is affixed to an inlet 93 of optical waveguide virtual image display 90 for providing a complete image thereto. Light rays from the complete image at image generation apparatus 92 are directed angularly toward a predetermined area on a first side 94 where they are reflected back toward a second side 95 and towards a third side 96, generally along an optical path defined by sides 94, 95 and 96. Three diffractive lenses 97, 98 and 99 are affixed to the sides at three predetermined areas, respectively to which the reflected light rays are directed. Diffractive lenses 97, 98 and 99 provide the required amount of magnification so that a virtual image of a desired size is viewable at an aperture 100 defined by an outlet 101 of optical waveguide virtual image display 90. Additional information on this type of virtual image display can be found in U.S. Pat. No. 5,224,198, entitled "WAVEGUIDE VIRTUAL IMAGE DISPLAY", issued Jun. 29, 1993, assigned to the same assignee and incorporated herein by this reference.

Figure 10:
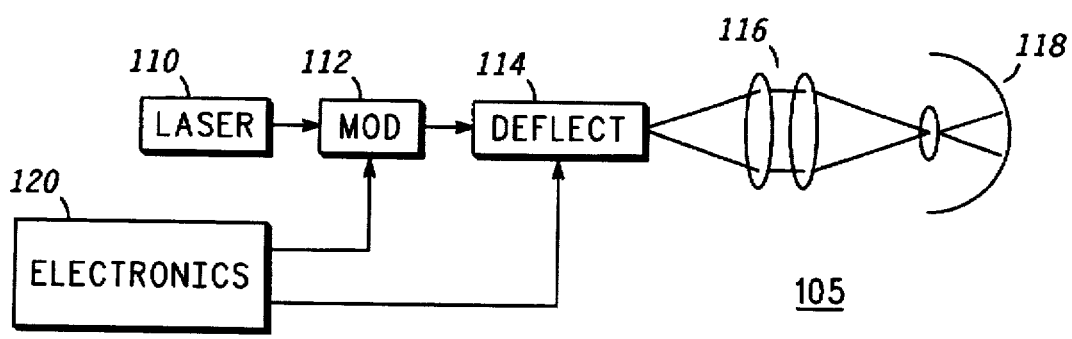
FIG. 10 is a block diagram of a direct retinal scan display according to the present invention.

FIG. 10 is a block diagram of a direct retinal scan display 105, which might also be utilized for the virtual image display of the present invention. A laser 110, which may be any of the well known lasers including solid state lasers, such as vertical cavity surface emitting lasers (VCSEL), diode lasers, diode-pumped lasers, etc., supplies a light beam to a modulator 112. Modulator 112 impresses video information onto the light beam generally by modulating the intensity the light beam as, for example, by providing changes in the power level of laser 110. Depending upon the application, the modulation could be as simple as turning laser 110 off and on, which essentially translates into a digital system. Acousto-optic modulators are one of the preferred modulators for most applications, but other techniques, such as electro-optics and mechanical are completely feasible.

The modulated light beam from modulator 112 is directed to a deflection system 114. A lens system 116 is used to focus the light beam from deflection system 114 into an eye 118. The focal length of lens system 116 is chosen so the scanning system focal point is within the pupil of eye 118 and the coherent beam focal point is at the retina of eye 118.

Timing and control of modulator 112 and deflection system 114 is provided by electronics 120. Electronics 120 include a basic oscillator, or timer, which provides the timing signals to cause the sweeping and modulating to occur at the proper times.

The purpose of deflection system 114 is to scan the modulated light beam on the retina of the eye 118, or "write" an image on the retina. There are many possible configurations for deflection system 114 and lens system 116, depending upon the application of the display and how it is desired to form the image in eye 118. Additional information on this type of display is available in a copending U.S. patent application entitled "DIRECT RETINAL SCAN DISPLAY", Ser. No. 07/857,193, filed Mar. 24, 1992 and assigned to the same assignee. While the direct retinal scan display does not technically generate a virtual image, the direct retinal scan display is included in the definition of a virtual image display for purposes of this disclosure because of the similarity thereto.

Lastly, it is disclosed to utilize a very small liquid crystal spatial light modulator (LCSLM) (not shown) as the image source for the miniature virtual image display of the present invention in conjunction with a magnifying optical system. This can take the form of a projection display, in which light modulated by the liquid crystal is projected by the optical system onto a diffusing screen, or it can take the form of a virtual display, where the optical system creates a large virtual image of the small complete image created by the LCSLM.

By using the LCSLM in a reflective mode, a reflective LCSLM is formed, which can be built onto a silicon substrate that contains the drive circuitry and other related electronics.

Specifically, the integrated electro-optic package for reflective spatial light modulators, as disclosed in copending application entitled "INTEGRATED ELECTRO-OPTIC PACKAGE FOR REFLECTIVE SPATIAL LIGHT MODULATORS", Ser. No. 08/360,504, filed Dec. 21, 1994, assigned to the same assignee and incorporated herein by this reference, discloses an array of reflective spatial light modulator pixels formed on a substrate with a light polarizing layer positioned in overlying relationship to the array and an optical waveguide positioned adjacent the polarizing layer and having a light source mounted adjacent an end thereto so that light is directed into the optical waveguide and further having a plurality of diffraction gratings formed therein so that deflected light substantially evenly illuminates the array and allows passage of reflected light from the array back through the waveguide. The package further includes a light polarizing layer positioned in overlying relationship to the array of reflective spatial light modulator pixels so that deflected light from the optical waveguide passes through the polarizing layer and reflected light from the array passes through the polarizing layer. Electrical connections are made from the array, through leads in the waveguide and to external contacts. A diffuser is mounted in overlying relationship to the waveguide to form an image plane for reflected light from the array. This type of system can be used to create the image generation apparatus 71 of FIG. 7.

Figure 11:
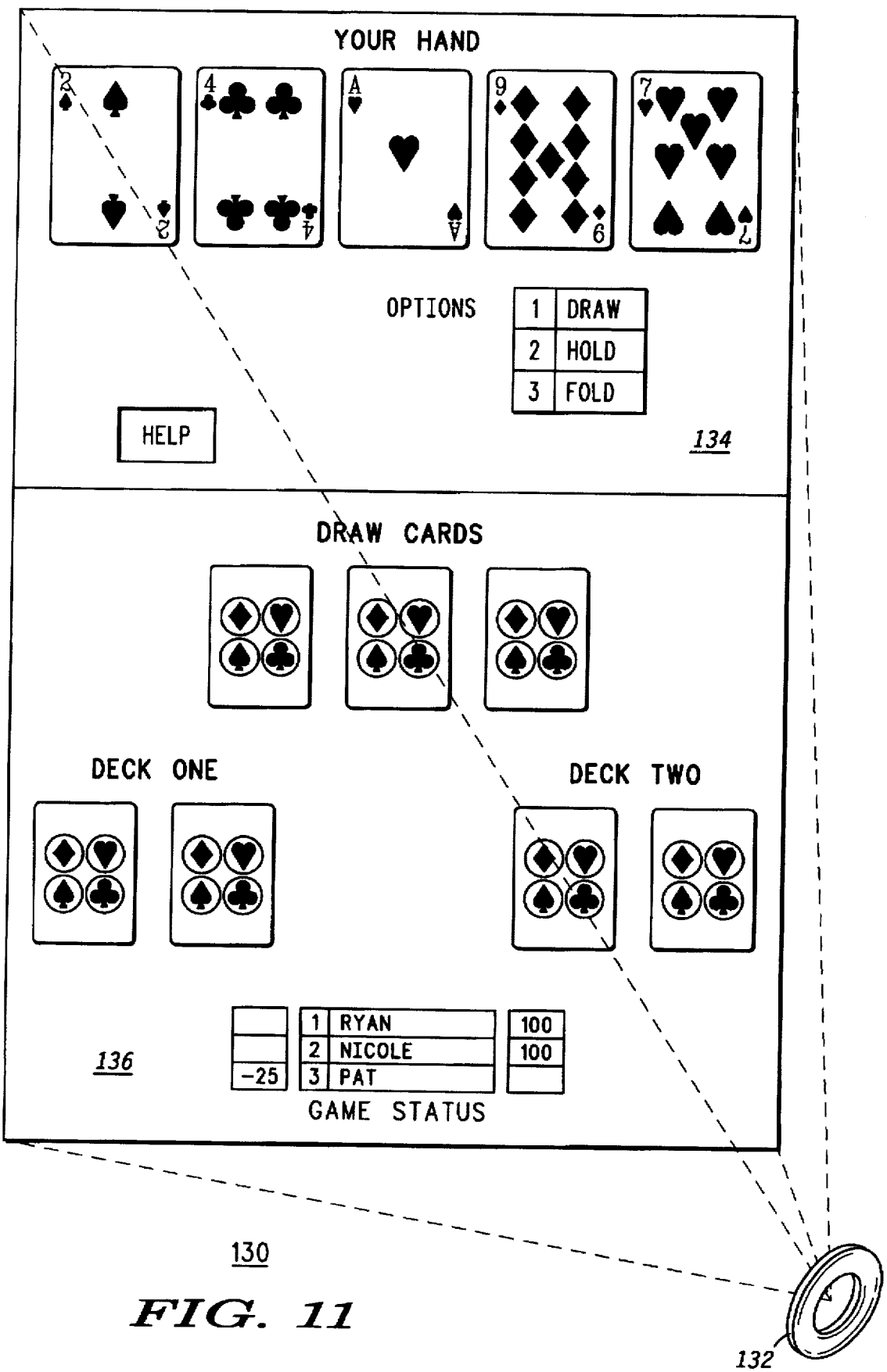
FIG. 11 illustrates an example of a virtual image seen through one of the personal display units according to the present invention.

As previously detailed, the image received by the personal display units of the present invention can be in the form of a direct view image and/or a virtual image. Referring specifically to FIG. 11, illustrated is an example of a virtual image 130 as seen through one of the personal display units 14, 14', 14", 22 and/or 32 of the present invention. There is depicted an aperture 132, generally located on the preferred embodiment of the personal display unit (discussed presently), through which the user would view the image received. Shown in this particular example is a split screen virtual image 130, displaying a private viewing game data and information area, generally referenced as 134, and a common viewing game data and information area, generally referenced as 136. As illustrated, private viewing area 134 shows in this particular card game example, the cards held by the player in control of that particular personal display unit. In addition, there is shown options that are open to the player in game play as well as a help "button" to aid the player in the game. The information displayed in private viewing area 134 is unique to that personal display unit and is not received by the other display units, thereby players, of the game. The lower portion of the screen, common viewing area 136, displays general game information available to all players. Information contained in common viewing area 136 can be information such as the cards "on the table", the previously discarded cards, and additional game scoring, etc. As previously stated, this information is simultaneously displayed to all players. Alternatively, this common viewing area 136 can be displayed as a direct view image (not shown), on either each personal display unit 14, 14', 14", 22 and/or 32, or centrally located, such as embedded in a game board (previously discussed) thereby permitting all players to view the information.

Movement within the virtual image of the personal display units can be controlled either through motion sensing devices or manual controls. It is disclosed to have contained within the personal display units 14, 14', 14", 22 and/or 32 of the present invention, a means for moving a cursor in the virtual image. This means for moving the cursor can be through various types of motion sensing devices and or manual controls. The player in control of a particular personal display unit would be able to input information by controlling the cursor in the virtual image. Further information on virtual image displays utilizing means for controlling the cursor within can be found in copending application entitled "MANUALLY CONTROLLABLE CURSOR AND CONTROL PANEL IN A VIRTUAL IMAGE", Ser. No. 08/158,342, filed Nov. 23, 1993, assigned to the same assignee and copending application entitled "MOTION RESPONSIVE CURSOR FOR CONTROLLING MOVEMENT IN A VIRTUAL IMAGE APPARATUS", Ser. No. 08/557,402, filed Nov. 13, 1995, assigned to the same assignee, both incorporated herein by this reference.

As previously disclosed, personal display units 14, 14', 14", 22 and/or 32 of the present invention can be of varying configurations. FIGS. 12–16 illustrate various embodiments for personal display units 14, 14', 14", 22 and/or 32. It should be understood that additional types of display units could be utilized, dependent upon the configuration of the game system of the present invention.

Figure 12:
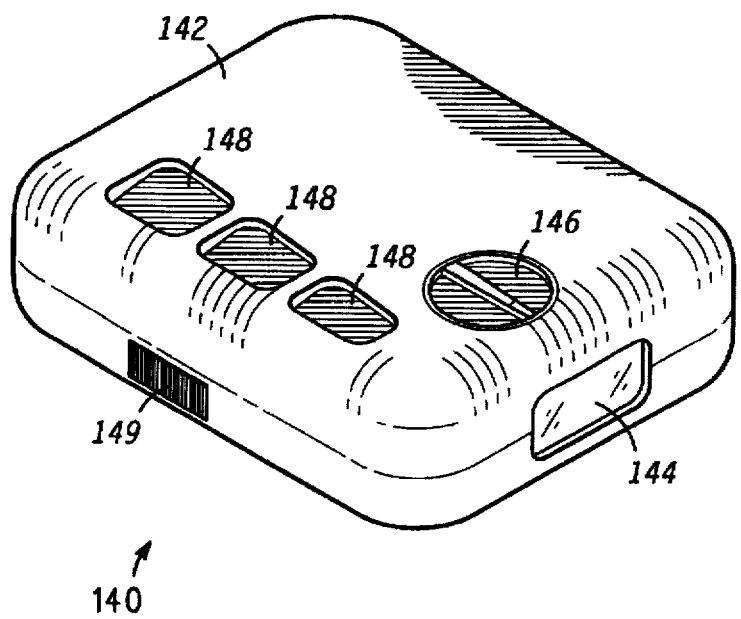
FIG. 12 illustrates an embodiment of a personal display unit according to the present invention.

Referring specifically to FIG. 12, illustrated is a simplified preferred personal display unit 140 of the present invention. Personal display unit 140 may have contained within, a control unit (previously described) dependent upon the specific configuration of the game system. Personal display unit 140 is composed of a rigid housing 142, having formed therein a viewing aperture 144 for viewing a virtual image and/or direct image, depending upon the image being displayed. In addition, there is provided on the exterior of housing 142, a plurality of controls, namely control 146 for focus adjustment and controls 147 for selecting specific choices and controlling the motion of the cursor when a virtual image is displayed through aperture 144. There is provided a power control switch 149 for controlling power to personal display unit 140.

Figure 13:
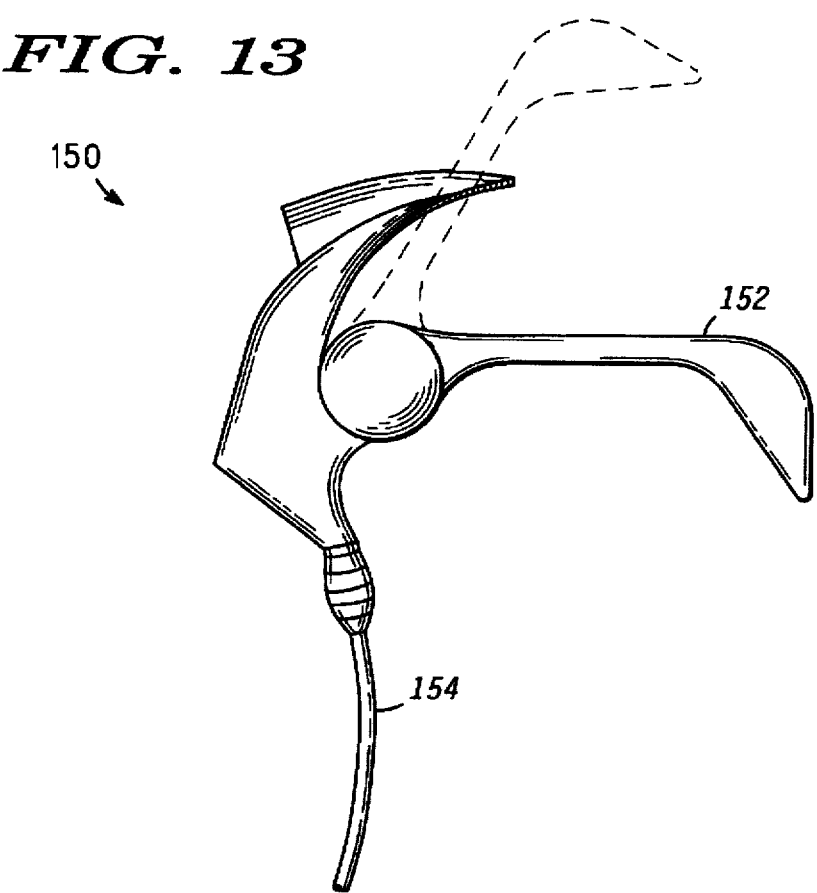
FIG. 13 illustrates a rotatably adjustable head-mount personal display unit according to the present invention.

A second embodiment of a personal display unit of the present invention, is a head-mounted display unit, illustrated in FIGS. 13 and 14 and designated 150 herein. As illustrated, head-mounted display unit 150 has provided a rotatably adjustable viewing aperture 152. In addition, as illustrated, there is provided a wire 154, leading to a communication or cursor control device (not shown) for communication to the control unit (not shown). It should be understood that alternative means for communicating to the control unit and/or moving the cursor within the virtual image display are anticipated by this disclosure, namely wireless communication and motion sensitive cursor control.

Figure 16:
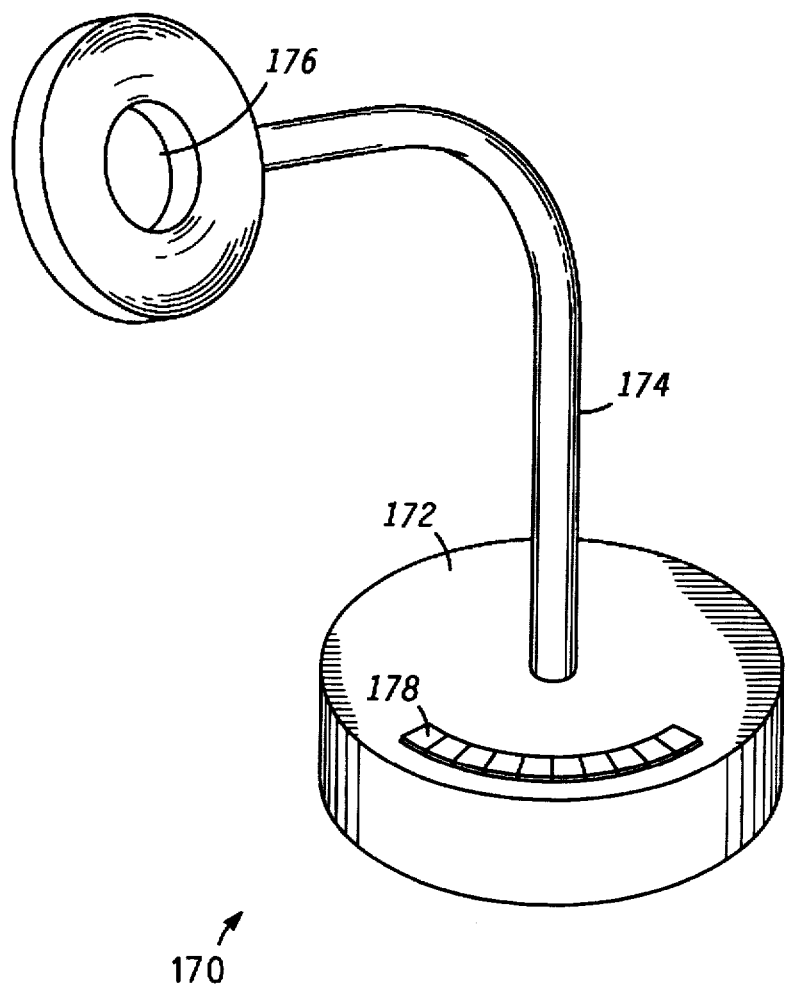
FIG. 16 illustrates an alternative embodiment of a table-mounted personal display unit according to the present invention.

Lastly, it is disclosed as yet another alternative embodiment for the personal display units of the present invention, to incorporate a table-mounted personal display unit with the game system, illustrated in FIGS. 15 and 16. Referring specifically to FIG. 15, illustrated is a rigidly supported table-mounted personal display unit 160. Table-mounted personal display unit 160 has provided, a plurality of supports 162 that suspend an "eyeglass-shaped" component 165, having formed therein a viewing aperture 166. There are provided a plurality of manual controls 164 for controlling the cursor in the viewed virtual image.

Alternatively, as illustrated in FIG. 16, table-mounted personal display unit 170 has provided a base support 172, having attached thereto an adjustable upright support 174. There is provided a viewing aperture 176, adjustable so as to properly align with the eye of the user, thus capable of viewing an image therein. Table-mounted personal display unit 170 has provided manual controls 178 for control of the cursor within the image viewed, and for power control to personal display unit 170.

Thus various configurations of the game system of the present invention have been disclosed. The various embodiments have been disclosed in specific configurations for purposes of explanation, however, it should be understood that various aspects of the disclosed configurations may be interchanged and/or combined with each other as well as additional aspects and configurations and it is fully intended that all such changes in the disclosed configurations come within the scope of the claims.

While we have shown and described specific embodiments of the game system and personal display units of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. An electronic game system comprised of:
   at least one control unit for receiving, compiling, monitoring, processing, and transmitting game data and information; and
   a plurality of personal display units in omni-directional communication with the at least one control unit, each of the plurality of personal display units including a virtual image display area for displaying as a virtual image, game data and information received from the at least one control unit.

2. The electronic game system of claim 1 wherein the at least one virtual image display area has provided an image source for generating the virtual image.

3. The electronic game system of claim 2 wherein the image source for displaying the virtual image is one of a light emitting diode, a liquid crystal display, a cathode ray tube, a field emission device, a laser projection, a direct retinal scan display, an inorganic electroluminescent display, a reflective spatial light modulator and a vertical cavity surface emitting laser.

4. The electronic game system of claim 1 wherein the at least one control unit is comprised of at least one microprocessor and a means for communication between the at least one microprocessor and the plurality of personal display units.

5. The electronic game system of claim 4 wherein the means for communication utilizes infra-red (IR) technology.

6. The electronic game system of claim 4 wherein the means for communication utilizes radio frequency (RF) technology.

7. The electronic game system of claim 4 wherein the means for communication utilizes vertical cavity surface emitting laser (VCSEL) technology.

8. The electronic game system of claim 4 wherein the means for communication utilizes fiber optical link technology.

9. The electronic game system of claim 4 wherein the means for communication utilizes cellular technology.

10. The electronic game system of claim 1 wherein the plurality of personal display units have at least one image viewing aperture formed therein.

11. The electronic game system of claim 10 wherein the plurality of personal display units are handheld personal display units.

12. The electronic game system of claim 10 wherein the plurality of personal display units are head-mounted personal display units.

13. The electronic game system of claim 10 wherein the plurality of personal display units are table-mounted personal display units.

14. An electronic game system comprised of:
   at least one control unit having contained therein at least one means for controlling and a means for communication, for receiving, compiling, monitoring, processing, and transmitting game data and information;
   a plurality of personal display units in omni-directional communication with the at least one control unit;
   a common view display area for receiving game data and information from the at least one control unit and displaying the game data and information on a central display, the central display being displayed as at least one of a direct view image and a virtual image; and
   a personal view display area for receiving game data and information from the at least one control unit and displaying the game data and information on the plurality of personal display units, the personal view display area being displayed as a virtual image.

15. The electronic game system of claim 14 wherein the at least one means for controlling includes at least one microprocessor.

16. The electronic game system of claim 14 wherein the at least one control unit is centrally located and separate from the plurality of personal display units.

17. The electronic game system of claim 14 wherein the at least one control unit is contained within one of the plurality of personal display units.

18. The electronic game system of claim 14 wherein the at least one control unit is contained within each of the plurality of personal display units.

19. The electronic game system of claim 18 wherein at least one control unit of the game system is recognized as a controlling control unit.

20. The electronic game system of claim 14 wherein the means for communication utilizes one of infra-red (IR) technology, radio frequency (RF) technology, vertical cavity surface emitting laser (VCSEL) technology, fiber optical link technology, and cellular technology.

21. The electronic game system of claim 14 further comprised of an image source for displaying the direct view image, comprised of one of a light emitting diode, a liquid crystal display, a cathode ray tube, a field emission device, a laser projection, a direct retinal scan display, an inorganic electroluminescent display, a plasma display and a vacuum fluorescent display.

22. The electronic game system of claim 14 further comprised of an image source for displaying the virtual image comprised of one of a light emitting diode, a liquid crystal display, a cathode ray tube, a field emission device, a laser projection, an inorganic electroluminescent display, a reflective spatial light modulator and a vertical cavity surface emitting laser.

23. The electronic game system according to claim 14 wherein the plurality of personal display units each have an image viewing aperture formed therein.

24. The electronic game system according to claim 23 wherein the plurality of personal display units are handheld personal display units.

25. The electronic game system according to claim 23 wherein the plurality of personal display units are head-mounted personal display units.

26. The electronic game system according to claim 23 wherein the plurality of personal display units are table-mounted personal display units.

27. An electronic game system comprised of:
   a control unit having contained therein at least one microprocessor and a means for communication, for receiving game data and information;
   a plurality of personal display units in omni-directional communication with the control unit;
   a common view display area for receiving game data and information from the control unit and displaying the game data and information on at least one of a central display as a direct view image and on the plurality of personal display units as a virtual image.
   and
   a personal view display area capable of receiving game data and information from the control unit and displaying the game data and information on the plurality of personal display units, the personal view display area being displayed as a virtual image.

28. The electronic game system of claim 27 wherein the control unit and the common view display area are embedded in a centrally located game board.

29. An electronic game system comprised of:
   a plurality of personal display units;
   at least one control unit, positioned within at least one of the plurality of personal display units, having contained therein a means for controlling and a means for communication with the plurality of personal display units;
   a common view display area for receiving game data and information from the control unit and displaying the game data and information on at least one of a central display as a direct view image and on the plurality of personal display units as a virtual image display; and
   a personal view display area capable of receiving game data and information from the control unit and displaying the game data and information on the plurality of personal display units, the personal view display area being displayed as a virtual image display.

30. The electronic game system of claim 29 wherein the means for controlling includes at least one microprocessor.

31. The electronic game system of claim 29 wherein a control unit is positioned within each of the plurality of personal display units.

* * * * *